Dec. 20, 1955   C. G. HELMICK, JR., ET AL   2,727,694
REGULATOR SYSTEM FOR PULP REFINER
Filed May 27, 1953   3 Sheets-Sheet 2

WITNESSES:

INVENTORS
Charles G. Helmick, Jr. &
Sylvester J. Campbell
BY
ATTORNEY

United States Patent Office 2,727,694
Patented Dec. 20, 1955

2,727,694

REGULATOR SYSTEM FOR PULP REFINER

Charles G. Helmick, Jr., Turtle Creek, and Sylvester J. Campbell, North Braddock, Pa., assignors to Westinghouse Electric Corporation, East Pittsburgh, Pa., a corporation of Pennsylvania Application May 27, 1953, Serial No. 357,872

5 Claims. (Cl. 241—37)

This invention relates to regulator systems and, more particularly, to regulator systems for either governing the operation of the movable electrodes of an electric arc furnace or for governing the operation of a Jordan pulp refiner.

In the past, many types of regulator systems have been utilized for controlling the operation of the movable electrodes of electric arc furnaces. For instance, rotating regulators having commutators are commonly used. However, such rotating regulators require considerable maintenance.

Many types of regulator systems for Jordan pulp refiners have also been utilized in the past. A great number of these prior art regulator systems for Jordan pulp refiners utilize contact-making wattmeters or ammeters. However, such prior art regulator systems for Jordans tend to oscillate unless wide regulating limits are set for the regulator system, which in turn decreases the sensitivity of the regulator system. In addition, the slow speed of response of the contact-making wattmeters or ammeters also decreases the sensitivity of the regulator system. Further, contact-making wattmeters or ammeters effect an on-off correction in a regulator system. Thus, a maximum correcting force is effected to drive the regulated quantity to a minimum or maximum extreme limit. Such an action in a regulator system is not nearly as desirable as an action in which a proportional correction is continuously being effected to thereby maintain a quantity at its regulated value. Furthermore, these prior art regulator systems for pulp refiners comprise non-static components which incur maintenance problems. It is to be noted that these undesirable prior art features, such as poor sensitivity and instability of the regulator system, decrease the life of the Jordan pulp refiner and impair the quality of the pulp refined thereby.

An object of this invention is to provide an economical static regulator system which is both sensitive and stable, by properly interconnecting a sensitive push-pull magnetic amplifier, responsive to a measure of the deviation of a quantity from a regulated value, with a multi-phase wound rotor motor, and by providing a given external resistance for the external rotor circuit of the wound rotor motor so that the motor's torque curve always has a negative slope irrespective of the speed of the motor, to thereby provide a stable regulator system.

Another object of this invention is to provide for maintaining a substantially constant horsepower input to a Jordan pulp refiner to thereby maintain a minimum of wear on the Jordan and a high quality of pulp refined thereby, by rendering a sensitive push-pull magnetic amplifier responsive to the load on the Jordan and by rendering a modified multi-phase wound rotor motor responsive to the output of the amplifier so as to control the operation of the Jordan, the wound rotor motor being modified so as to be provided with a given amount of external rotor resistance to thereby render the overall system substantially stable.

A further object of this invention is to provide for maintaining a substantially constant electrode arc for an arc furnace, by controlling the positioning of the electrode by means of a static regulator system which is both sensitive and stable.

Other objects of this invention will become apparent from the following description when taken in conjunction with the accompanying drawings, in which.

Figure 3:
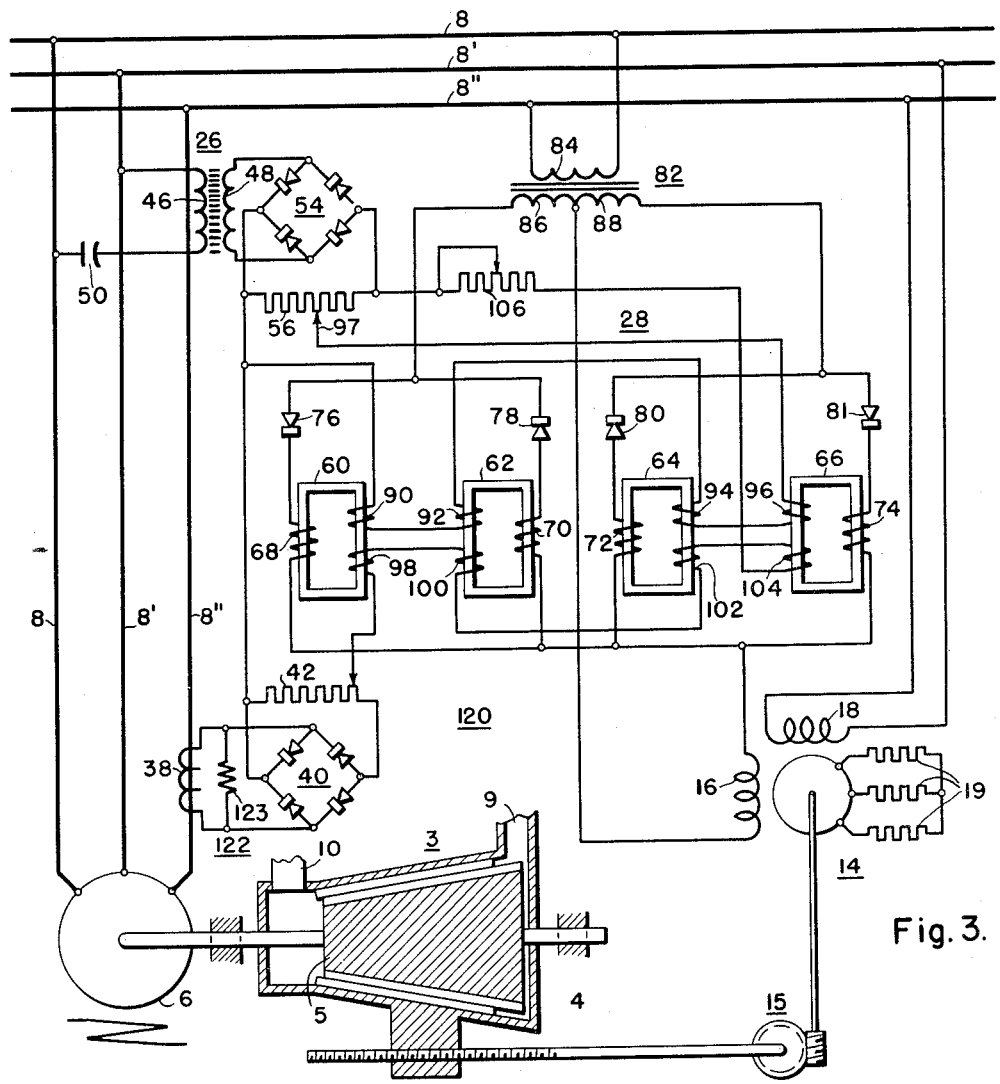
Figure 4:
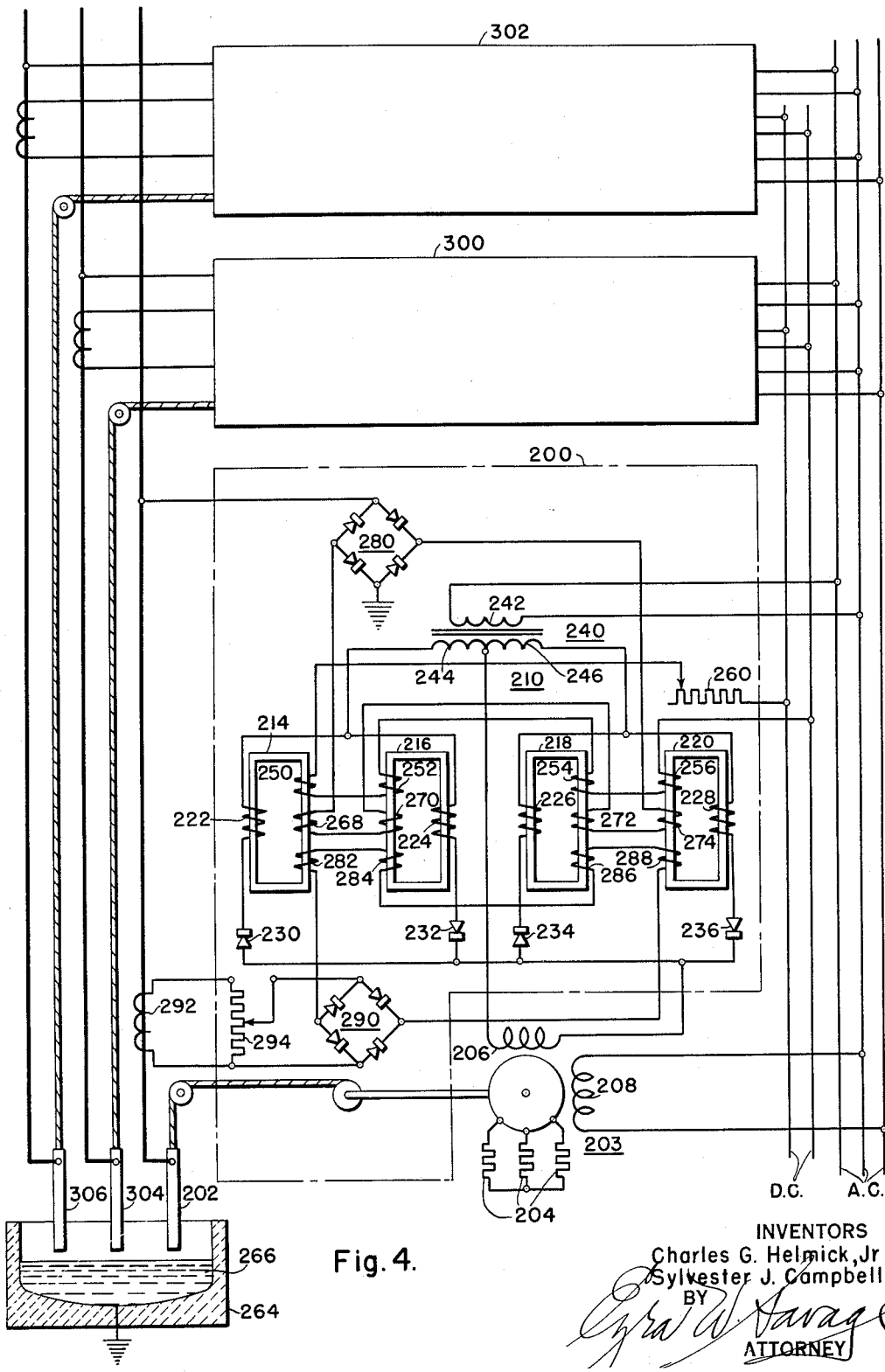

Fig. 3 is a schematic diagram of another embodiment of this invention in which a current-sensing regulator system embodying the teachings of this invention maintains a substantially constant horsepower input to a Jordan pulp refiner; and Fig. 4 is a schematic diagram of a further embodiment of this invention in which a regulator system embodying the teachings of this invention maintains a substantially constant arc for an arc furnace.

Figure 1:
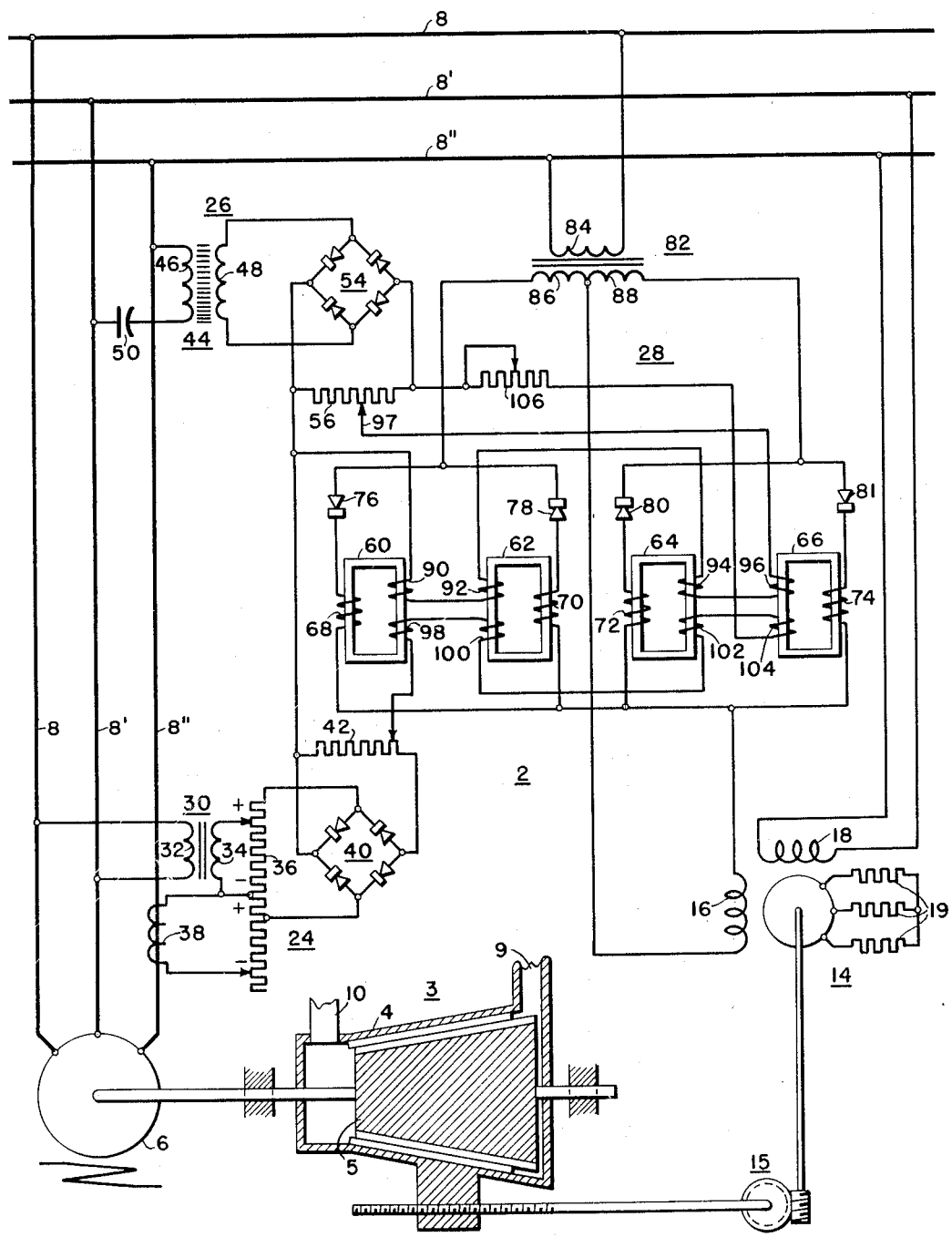
Figure 1 is a schematic diagram of a watt-sensing regulator system embodying the teachings of this invention and which maintains a substantially constant horsepower input to a Jordan pulp refiner.

Referring to Fig. 1, there is illustrated a watt-sensing regulator system 2 for maintaining a substantially constant horsepower input to a Jordan pulp refiner 3. In this instance, the pulp refiner 3 comprises an enclosure 4 and a conical-shaped rotating element 5 which is mechanically driven by a synchronous drive motor 6 which receives power from line conductors 8, 8' and 8''. In practice, the unrefined pulp is fed through an inlet pipe 9 and then refined by passing between the rotating element 5 and the enclosure 4. The refined pulp then passes out through an outlet pipe 10.

Figure 2:
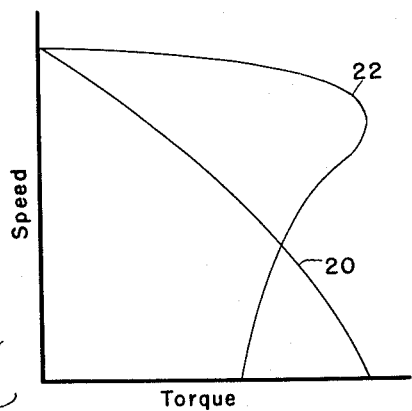
Fig. 2 is a graph illustrating torque curves for a multi-phase wound rotor motor that is incorporated in the regulator systems illustrated in Figs. 1, 3 and 4.

In order to control the positioning of the rotating element 5 with respect to the enclosure 4 to thereby control the magnitude of the load on the pulp refiner 3 and on the drive motor 6, a modified two-phase wound rotor motor 14 is provided. In particular, the wound rotor motor 14 is mechanically connected to the enclosure 4 of the pulp refiner 3 through gearing 15. As illustrated, the wound rotor motor 14 comprises a control winding 16 and a reference winding 18 which is connected to the line conductors 8' and 8''. A plurality of resistors 19 are connected in the external rotor circuit of the motor 14 in order to provide a predetermined torque curve for the motor 14 which always has a negative slope irrespective of the speed of the motor 14. In other words, by providing a predetermined amount of external rotor resistance for the motor 14, the motor 14 is given a drooping torque characteristic to thereby render the regulator system 2 stable. The negative slope of the torque curve of the motor 14 is illustrated by a curve 20 shown in Fig. 2. On the other hand, the curve 22 of Fig. 2 illustrates the torque curve for a wound rotor motor that is not provided with external rotor resistance. As can be realized, operation of an ordinary wound rotor motor (not shown) on the substantially vertical portion of the torque curve 22 would render a regulator system (not shown) unstable.

In general, the regulator system 2 comprises a watt sensing network 24 for producing at its output a direct-current voltage indicative of the watts input to the drive motor 6, a voltage reference network 26 for producing at its output a substantially constant direct-current voltage, a push-pull magnetic amplifier 28 responsive to the difference in the direct-current outputs of the voltage reference network 26 and the watt sensing network 24, the output of the amplifier 28 being so connected to the control winding 16 of the motor 14 that the phase relationship between the current flow through the control winding 16 and the current flow through the reference winding 18 varies in accordance with the direction of the deviation of the direct-current output voltage of the watt-sensing network 24 from the direct-current output voltage of the voltage reference network 26, to thereby effect a rotation of the motor 14 in one direction or the other in accordance with the deviation to thus maintain, as will be explained more fully hereinafter, a substantially constant horsepower input to the pulp refiner 3.

In particular, the watt-sensing network 24 comprises a potential transformer 30 having a primary winding 32 and a secondary winding 34. As illustrated, the secondary winding 34 is connected across a portion of a resistor 36. In order to render this portion of the resistor 36 responsive to the voltage input to the drive motor 6, the primary winding 32 of the potential transformer 30 is connected to the line conductors 8 and 8'. On the other hand, in order to render another portion of the resistor 36 responsive to the current input to the drive motor 6, a current transformer 38 is provided, one end of the winding of the current transformer 38 being connected to one end of the secondary winding 34 of the potential transformer 30 and the other end of the winding of the current transformer 38 being connected to the resistor 36. A predetermined amount of the voltage produced across the resistor 36 by the potential transformer 30 and the current transformer 38 is rectified by means of a full-wave dry-type rectifier 40 having input and output terminals. As illustrated, the input terminals of the rectifier 40 are connected to the resistor 36 and the output terminals of the rectifier 40 are connected to a resistor 42 across which is produced a direct-current voltage which is indicative of the magnitude of the watts input to the drive motor 6.

Referring more particularly to the voltage reference network 26, it can be seen that this network comprises a saturating transformer 44 having a primary winding 46 and a secondary winding 48. As illustrated, one end of the primary winding 46 is connected to the line conductor 8" and the other end of the primary winding 46 is connected to the line conductor 8' through a capacitor 50 which, in conjunction with the primary winding 46 forms a ferro-resonant circuit, to thereby provide a substantially constant average output voltage across the secondary winding 48 of the transformer 44 over a wide range of variation in the magnitude of the voltage that appears across the line conductors 8' and 8". Of course, it is to be understood that the voltage across the line conductors 8' and 8" should always be of sufficient magnitude to effect a substantially complete magnetic saturation of the core of the transformer 44.

In order to rectify the voltage across the secondary winding 48 of the transformer 44 and thereby produce a substantially constant direct-current output voltage for the voltage reference network 26, a full-wave dry-type rectifier 54 is provided. In particular, the input terminals of the rectifier 54 are connected to the secondary winding 48 of the transformer 44 and the output terminals are connected to a resistor 56 across which the substantially constant direct-current voltage appears.

On the other hand, the push-pull magnetic amplifier 28 comprises, in this instance, four rectangular magnetic core members 60, 62, 64 and 66 constructed of magnetic core material. In order to magnetize the core members 60, 62, 64 and 66 a predetermined amount, load windings 68, 70, 72 and 74 are disposed in inductive relationship with the core members 60, 62, 64 and 66, respectively. Self-saturation of the amplifier 28 is obtained by connecting self-saturating rectifiers 76, 78, 80 and 81 in series circuit relationship with the load windings 68, 70, 72 and 74, respectively. In this instance, as will be explained more fully hereinafter, a potential transformer 82 having a primary winding 84 and a secondary winding comprising sections 86 and 88, supplies energy to the load windings 68, 70, 72 and 74.

For the purpose of biasing the core members 60, 62, 64 and 66 a predetermined amount, biasing windings 90, 92, 94 and 96 are disposed in inductive relationship with the core members 60, 62, 64 and 66, respectively. The energizing circuit for the biasing windings 90, 92, 94 and 96 extends from one end of the resistor 56 through the biasing windings 90, 92, 94 and 96, and through a slidable contact member 97 to the midportion of the resistor 56. The biasing windings 90, 92, 94 and 96 are so disposed on their respective core members that current flow through these biasing windings produces a flux in their respective core members that opposes the flux produced in these core members by their associated load windings 68, 70, 72 and 74, respectively.

As hereinbefore mentioned, the magnetic amplifier 28 is responsive to the difference in the direct-current outputs of the watt-sensing network 24 and the voltage reference network 26. This is accomplished by disposing control windings 98, 100, 102 and 104 in inductive relationship with the core members 60, 62, 64 and 66, respectively, and by connecting these control windings in series circuit relationship with one another, one end of this series circuit being connected through a variable resistor 106 to one end of the resistor 56, the other end of the series circuit being connected to one end of the resistor 42 of the watt-sensing network 24. In order to complete the energizing circuit for the control windings 98, 100, 102 and 104 the other ends of the resistors 42 and 56 are electrically connected to one another.

Before putting the apparatus illustrated in Fig. 1 into operation, certain adjustments must first be made. For instance, the watt-sensing network 24 must be adjusted so as to obtain the proper magnitude relationship between the two alternating-current voltages received from the current transformer 38 and from the potential transformer 30. In addition, the resistor 106 must be adjusted to obtain the desired current flow through the control windings 98, 100, 102 and 104. Further, in order to obtain the proper magnitude of current flow through the biasing windings 90, 92, 94 and 96 the slidable contact member 97 of the resistor 56 must be properly adjusted.

In operation, the watt-sensing regulator 2 maintains a substantially constant horsepower input to the pulp refiner 3 even though the input voltage to the synchronous drive motor 6 varies and even though the load on the pulp refiner 3 changes due to a change in the type of unrefined pulp fed to the refiner 3 or due to a change in the amount of unrefined pulp fed to the refiner 3 or due to wearing of the rotating elements of the refiner 3. If the input voltage to the synchronous drive motor 6 increases to a value above its normal value, the power factor on the line conductors 8, 8' and 8" changes so as to decrease the current input to the synchronous drive motor 6. This input current to the drive motor 6 decreases in proportion to the increase in the input voltage to the motor 6 and, therefore, the input voltage to the rectifier 40 of the watt-sensing network 24 remains unchanged. Thus, the wound rotor motor 14 with such a change in the input voltage to the synchronous motor 6 does not effect a repositioning of the enclosure 4 with respect to the rotating element 5 of the pulp refiner 3. Further, since the motor 6 is a synchronous motor the speed of the rotating element 5 remains unchanged. Therefore, the product of motor torque and motor speed and thus the horsepower input to the pulp refiner 3 remains unchanged even though there is either an increase or a decrease in the input voltage to the motor 6.

On the other hand, assuming the load on the pulp refiner 3 increases due to, for instance, a change in the consistency or in the type of paper stock fed to the pulp refiner 3, so as to increase the torque of the synchronous motor 6, the current input to the motor 6 increases to thereby increase the magnitude of the direct-current output voltage of the watt-sensing network 24. An increase in the output voltage of the watt-sensing network 24 effects a current flow from one end of the resistor 56 through the resistor 106, the control windings 104, 102, 100 and 98 to one end of the resistor 42, to thereby increase the magnetic saturation of the core members 64 and 66 and decrease the magnetic saturation of the core members 60 and 62 to the cut off point.

With an increase in the magnetic saturation of the core members 64 and 66 and with a decrease in the magnetic saturation of the core members 60 and 62, current, during one-half cycle of the alternating current as applied to the transformer 82, flows from one end of the secondary winding section 88 of the transformer 82 through the self-saturating rectifier 81 of the amplifier 28, the load winding 74, and the control winding 16 of the motor 14 to the other end of the secondary winding section 88. During the next one-half cycle of alternating current as applied to the transformer 82, current flows from the junction point of the secondary winding sections 86 and 88 of the transformer 82 through the control winding 16 of the motor 14, the load winding 72 of the amplifier 28 and the rectifier 80, to the other end of the secondary winding section 88. The phase relationship of this current flow through the control winding 16 of the motor 14 with respect to the current flow through the reference winding 18 is such as to effect a movement of the enclosure 4 of the pulp refiner 3 to the left, as illustrated in the drawings, to thereby decrease the torque of the motor 6 and thus return, since the speed of the synchronous motor 6 has remained unchanged, the horsepower input to the pulp refiner 3 to its regulated value.

On the other hand, assuming the load on the pulp refiner 3 decreases so as to effect a decrease in the torque of the synchronous motor 6 and thus a decrease in the input current to the motor 6, the direct-current output voltage of the watt-sensing network 24 will decrease to thereby effect a current flow from one end of the resistor 42 through the control windings 98, 100, 102 and 104 and through the resistor 106 to one end of the resistor 56. Such a current flow increases the magnetic saturation of the core members 60 and 62 and decreases the magnetic saturation of the core members 64 and 66 to the cut off point. Under such conditions, during one-half cycle of the alternating current as applied to the transformer 82, current flows from the junction point of the secondary winding sections 86 and 88 of the transformer 82 through the control winding 16 of the motor 14, the load winding 70 of the amplifier 28, and through the rectifier 78 to the other end of the secondary winding section 86. During the next one-half cycle of alternating current as applied to the transformer 82, when the left side of the secondary winding section 86 is positive, current flows from this side of the winding section 86 through the rectifier 76 of the magnetic amplifier 28, load winding 68, and through the control winding 16 of the motor 14 to the junction point of the secondary winding sections 86 and 88. Thus, with a decrease in the load on the pulp refiner 3 from a given value, the current flow through the control winding 16 of the motor 14 is displaced 180° from the current that flows through the control winding 16 when there is an increase in the load on the pulp refiner 3 from the given value. Therefore, with such a decrease in the load on the pulp refiner 3 the motor 14 effects a movement of the enclosure 4 of the refiner 3 to the right, as illustrated in the drawings, to thereby increase the torque of the synchronous motor 6 and thus return the horsepower input of the pulp refiner 3 to its regulated value.

So far the description of the apparatus illustrated in Fig. 1 has been with reference to a synchronous drive motor 6, however, it is to be understood that a multi-phase induction motor (not shown) could be substituted for the synchronous motor 6.

Assuming a multi-phase induction motor (not shown) is substituted for the synchronous motor 6 and that there is an increase in the input voltage to the induction motor (not shown), the speed of the induction motor will increase to thereby increase the speed of rotation of the rotating element 5 of the refiner 3 to thus increase the horsepower input to the pulp refiner 3. However, an increase in the input voltage to the induction motor (not shown) increases the direct-current output voltage of the watt-sensing network 24 to thereby effect a movement of the enclosure 4 to the left, as illustrated in the drawings, to thereby decrease the torque of the induction motor (not shown) and thus return the input horsepower to the pulp refiner 3 to its regulated value.

Still assuming that a multi-phase induction motor (not shown) has been substituted for the synchronous motor 6, and further assuming that the input voltage to the induction motor (not shown) decreases to a value below its normal value, the speed of the induction motor (not shown) will decrease to thereby decrease the speed of rotation of the rotating element 5 of the pulp refiner 3, to thus decrease the horsepower input to the pulp refiner 3. However, a decrease in the input voltage to the induction motor (not shown) effects a decrease in the direct-current output voltage of the watt-sensing network 24 to thereby effect a movement of the enclosure 4 of the pulp refiner 3 to the right, as illustrated in the drawings, to thereby increase the torque of the induction motor (not shown) and thus return the horsepower input to the pulp refiner 3 to its regulated value.

Under varying load on the pulp refiner 3 a multi-phase induction motor (not shown) cooperates with the regulator system 2 in the same manner as does the synchronous drive motor 6. Therefore, a description of such cooperation when utilizing an induction motor (not shown) is deemed unnecessary.

Referring to Fig. 3 there is illustrated another embodiment of the teachings of this invention in which like components of Figs. 1 and 3 have been given the same reference characters. In Fig. 3 this invention is illustrated with respect to a current-sensing regulator system 120 for maintaining a substantially constant horsepower input to the pulp refiner 3.

In general, the regulator system 120 comprises a current-sensing network 122 for obtaining a measure of the current input to the synchronous drive motor 6, the voltage reference network 26, and the push-pull magnetic amplifier 28 for controlling the operation of the wound rotor motor 14, the amplifier 28 being responsive to the difference in the direct-current output voltages of the current-sensing network 122 and the voltage reference network 26.

The current-sensing network 122 comprises the current transformer 38, the winding of which is connected to the input terminals of the rectifier 40, and the resistor 42 which is connected to the output terminals of the rectifier 40 to thereby obtain across the resistor 42 a direct-current voltage which is proportional to the magnitude of the input current to the synchronous drive motor 6. In order to insure a continuous closed circuit for the current transformer 38, a resistor 123 is connected across the winding of the current transformer 38.

In order to obtain proper operation of the apparatus illustrated in Fig. 3 when utilizing the synchronous drive motor 6, it is necessary to maintain a substantially constant input voltage to this motor 6. However, with changes in load on the pulp refiner 3 the regulator system 120 properly cooperates with the remaining apparatus to maintain a substantially constant horsepower input to the pulp refiner 3. Since the magnetic amplifier 28 and the motor 14 illustrated in Fig. 3 function in the same manner as does the magnetic amplifier 28 and the motor 14 illustrated in Fig. 1, in maintaining a substantially constant horsepower input to the pulp refiner 3 with varying loads on the refiner 3, a further description of the operation of the regulator system 120 is deemed unnecessary.

Referring to Fig. 4, there is illustrated still another embodiment of this invention in which a regulator system 200 is disposed to maintain a substantially constant arc for a movable electrode 202 incorporated in an electric arc furnace.

The regulator system 200 is similar to the regulator systems 2 and 120 illustrated in Figs. 1 and 3, respectively, except that the regulator system 200 responds to the magnitude of the arc current and to the magnitude of the arc voltage to thereby control the operation of a two-phase wound rotor motor 203 having external rotor resistors 204, a control winding 206 and a reference winding 208. It is to be noted that the torque curve for the wound rotor motor 203 is also illustrated by the curve 20 shown in Fig. 2.

Broadly, the regulator system 200 comprises a push-pull magnetic amplifier 210 responsive to the arc current and the arc voltage of the electrode 202 and the wound rotor motor 203 responsive to the output of the amplifier 210 and disposed to control the positioning of the movable electrode 202 to thus maintain a substantially constant arc for the electrode 202. In particular, the magnetic amplifier 210 comprises, in this instance, rectangular core members 214, 216, 218 and 220. In order to magnetize the core members 214, 216, 218 and 220 a predetermined amount, load windings 222, 224, 226 and 228, respectively, are disposed in inductive relationship therewith. Self-saturation of the magnetic amplifier 210 is obtained by connecting self-saturating rectifiers 230, 232, 234 and 236 in series circuit relationship with the load windings 222, 224, 226 and 228, respectively. The manner in which the load windings are energized from a potential transformer 240, having a primary winding 242 and secondary winding sections 244 and 246, will be described hereinafter.

In order to bias the core members 214, 216, 218 and 220 a predetermined amount, biasing windings 250, 252, 254 and 256, respectively, are disposed in inductive relationship therewith. As illustrated, the biasing windings 250, 252, 254 and 256 are connected in series circuit relationship with one another, one end of the series circuit being connected through a variable resistor 260 to the negative side of a direct-current source of energy and the other end of the series circuit being connected to the positive side of the direct-current source of energy. In this instance, the biasing windings 250, 252, 254 and 256 are so disposed that current flow through these biasing windings produces a flux that opposes the flux produced by the current flow through each of their associated load windings 222, 224, 226 and 228, respectively.

In order to render the magnetic amplifier 210 responsive to the arc voltage between the movable electrode 202 and a container 264 having disposed therein molten metal 266, control windings 268, 270, 272 and 274 are disposed in inductive relationship with the core members 214, 216, 218 and 220, respectively. In particular, the control windings 268, 270, 272 and 274 are connected in series circuit relationship with one another, this series circuit being connected to the output terminals of a full-wave dry-type rectifier 280 whose input is responsive to the arc voltage of the electrode 202. It is to be noted that the control windings 268, 270, 272 and 274 are so disposed on their respective core members that the flux produced by the current flow through the control windings 272 and 274 opposes the flux produced by the current flow through the associated load windings 226 and 228, respectively. On the other hand, the current flow through the control windings 268 and 270 produces a flux which is additive to the flux produced by the current flow through the associated load windings 222 and 224, respectively.

In order to render the magnetic amplifier 210 responsive to the arc current of the electrode 202, control windings 282, 284, 286 and 288 are disposed in inductive relationship with the core members 214, 216, 218 and 220, respectively. As illustrated, the control windings 282, 284, 286 and 288 are likewise connected in series circuit relationship with one another, the series circuit being connected to the output terminals of a full-wave dry-type rectifier 290. In this instance, the input terminals of the rectifier 290 are connected to the winding of a current transformer 292, which current transformer is responsive to the arc current. In order to vary the magnitude of the current flow through the control windings 282, 284, 286 and 288, a variable resistor 294 is connected in parallel circuit relationship with the winding of the current transformer 292. It is to be noted that the control windings 282, 284, 286 and 288 are so disposed on their respective core members that current flow through the control windings 282, 284, 286 and 288 produces a flux that opposes the flux produced by the current flow through the associated control windings 268, 270, 272 and 274, respectively.

In order to simplify the description of the apparatus illustrated in Fig. 4 only the regulator system 200 is described, it being understood that a regulator system 300 and a regulator system 302 similar to the regulator system 200 is provided for the movable electrodes 304 and 306, respectively.

In operation, when the movable electrode 202 is in the regulated position and the desired arc is being produced, the flux produced by the current flow through the control windings 268, 270, 272 and 274 offsets the flux produced by the current flow through the control windings 282, 284, 286 and 288 to thus render zero current flow through the control winding 206 of the wound rotor motor 203. Therefore, under such a regulated condition there is no movement of the movable electrode 202. However, if the arc current of the electrode 202 increases to a value above its regulated value, the output current of the rectifier 290 increases to thereby increase the magnetic saturation of the core members 218 and 220 and decrease the magnetic saturation of the core members 214 and 216 to the cut off point. Under such conditions, during one-half cycle of the alternating current as applied to the transformer 240 when the right end of the secondary winding section 246 is positive, current flows from this end of the secondary winding section 246 through the load winding 228 of the amplifier 210, the rectifier 236, and through the control winding 206 of the motor 203 to the junction point of the secondary winding sections 244 and 246. During the next one-half cycle of alternating current as applied to the transformer 240 when the left end of the secondary winding section 244 is positive, current flows from the junction point of the secondary winding sections 244 and 246 through the control winding 206 of the motor 203, the rectifier 234 of the amplifier 210, and the load winding 226 to the other end of the secondary winding section 246. Such an alternating current flow through the control winding 206 of the motor 203 is of such a phase relationship with respect to the alternating current flow through the reference winding 208 of the motor 203 that the motor 203 rotates in a direction to effect a raising of the movable electrode 202 to thus decrease the arc current of the electrode 202 to its regulated value and return the apparatus to the regulated condition.

On the other hand, a decrease in the arc current below its regulated value decreases the current flow through the control windings 288, 286, 284 and 282 to thereby increase the magnetic saturation of the core members 214, 216 and decrease the magnetic saturation of the core members 218 and 220 to the cut off point. When this occurs and when the right end of the secondary winding section 246 of the transformer 240 is at a positive potential, current flows from the junction point of the secondary winding sections 244 and 246 through the control winding 206 of the motor 203, the rectifier 230 of the amplifier 210, and the load winding 222 to the other end of the secondary winding section 244. During the next one-half cycle of alternating current as applied to the transformer 240, when the left end of the secondary winding section 244 is at a positive potential, current flows from this end of the secondary winding section 244 through the load winding 224 of the amplifier 210, the rectifier 232, and the control winding 206 of the motor 203 to the junction point of the secondary winding sections 244 and 246. Such an alternating current flow through the control winding 206 of the motor 203 is 180° out of phase with the current flow through the control winding 206 as produced by an increase in the arc current of the movable electrode 202. Therefore, with a decrease in the arc current of the movable electrode 202 below its regulated value, the motor 203 is caused to rotate in such a direction as to effect a lowering of the movable electrode 202 to thereby restore the arc current to its regulated value.

In operation, an increase in the arc voltage of the electrode 202 above its regulated value increases the current flow through the control windings 272, 274, 270 and 268 to thereby decrease the magnetic saturation of the core members 218 and 220 to the cut off point and increase the magnetic saturation of the core members 214 and 216. Such an action produces a current flow through the control winding 206 of the motor 203 which has such a phase relationship with respect to the current flow through the reference winding 208 of the motor 203 that the motor 203 effects a lowering of the movable electrode 202 to thereby restore the arc voltage to its regulated value.

On the other hand, if the arc voltage decreases to a value below its regulated value the current flow through the control windings 274, 272, 270 and 268 decreases to thereby increase the magnetic saturation of the core members 218 and 220 and decrease the magnetic saturation of the core members 214 and 216 to the cut off point. Under such conditions, the phase relationship between the current flow through the control winding 206 of the motor 203 and the current flow through the reference winding 208 is such as to effect a raising of the movable electrode 202 to thereby again restore the arc voltage to its regulated value.

Although a two-phase wound rotor motor has been illustrated in Figs. 1, 3 and 4 for the wound rotor motors 14 and 203, it is to be understood that a three-phase wound rotor motor (not shown) could be substituted for the wound rotor motor 14 or for the motor 203. In making such a substitution, one of the windings of the three-phase wound rotor motor (not shown) would be connected so as to constitute the reference winding and the other two windings of the three-phase wound rotor motor (not shown) would be connected in series circuit relationship with one another so as to constitute the control windings for the three-phase wound rotor motor (not shown).

The apparatus embodying the teachings of this invention has several advantages. For instance, the regulator systems illustrated herein are static, sensitive, and also stable. In addition, by utilizing the modified wound rotor motors 14 and 203 illustrated herein, the cost of the apparatus is considerably decreased. For instance, if an ordinary two-phase induction motor (not shown) were utilized in place of the motor 14 or in place of the motor 203, it would be necessary to insert sufficient internal rotor resistance in the induction motor (not shown) to get a desired torque curve to thereby obtain a stable regulator system. By inserting this internal rotor resistance in the two-phase induction motor (not shown) the size of the motor is increased and in addition special cooling means must be provided to dissipate the heat effected by the additional internal rotor resistance.

Since numerous changes may be made in the above-described apparatus and circuits and different embodiments of the invention may be made without departing from the spirit and the scope thereof, it is to be understood that all the matter contained in the foregoing description or shown in the accompanying drawings shall be interpreted as illustrative and not in a limiting sense.

We claim as our invention:

1. In a regulator system for maintaining a given quantity substantially constant by controlling the relative positioning of an object with respect to another object, the combination comprising, a push-pull amplifier responsive to a measure of the deviation of the quantity from its regulated value, a multi-phase wound rotor motor for controlling the positioning of said object with respect to said another object, said motor having a reference winding and a control winding and a predetermined amount of external rotor resistance so that said motor has a drooping torque characteristic to thereby provide stability for the regulator system, and circuit means for so connecting the output of the push-pull amplifier to the control winding of said motor that the phase relationship between the current flow through the control winding and the current flow through said reference winding varies in accordance with the direction of the deviation of the quantity from its regulated value to thereby effect a rotation of said motor in a given direction in accordance with the direction of such deviation to thus maintain the quantity substantially constant.

2. In a regulator system for maintaining a substantially constant horsepower input to a pulp refiner having a rotating element and an enclosure, the combination comprising, a drive motor for driving the rotating element of the pulp refiner, watt-sensing network for producing at its output a direct-current voltage indicative of the watts input to the drive motor, a voltage reference network for producing at its output a substantially constant direct-current voltage, a push-pull magnetic amplifier responsive to the difference in the direct-current output voltages of the voltage reference network and the watt sensing network, a multi-phase wound rotor motor for controlling the positioning of the rotating element with respect to the enclosure of the pulp refiner, said wound rotor motor having a reference winding and a control winding and a predetermined amount of external rotor resistance so that said wound rotor motor has a drooping torque characteristic to thereby provide stability for the regulator system, and circuit means for so connecting the output of the push-pull magnetic amplifier to said control winding that the phase relationship between the current flow through said control winding and the current flow through said reference winding varies in accordance with the direction of the deviation of the direct-current output voltage of the watt-sensing network from the direct-current output voltage of the voltage reference network, to thereby effect a rotation of said wound rotor motor in a given direction to thus maintain a substantially constant horsepower input to the pulp refiner.

3. In a regulator system for maintaining a substantially constant horsepower input to a pulp refiner having a rotating element and an enclosure, the combination comprising, an alternating-current drive motor for driving the rotating element of the pulp refiner, a watt-sensing network including a resistor, a potential transformer having a primary winding and a secondary winding, the primary winding being responsive to the voltage input to said drive motor and the secondary winding being connected across a portion of said resistor, a current transformer responsive to the current input to said drive motor, one end of the winding of the current transformer being connected to one end of the secondary winding of the potential transformer and the other end of the winding of the current transformer being connected to said resistor so that a voltage is produced across another portion of said resistor that is a measure of the current input to said drive motor, and a rectifier connected to said resistor for producing at the output of the watt-sensing network a direct-current voltage indicative of the watts input to said drive motor, a voltage reference network for producing at its output a substantially constant direct-current voltage, a push-pull magnetic amplifier responsive to the difference in the direct-current output voltages of the voltage reference network and the watt-sensing network, a multi-phase wound rotor motor for controlling the positioning of the rotating element with respect to the enclosure of said pulp refiner, said wound rotor motor having a reference winding and a control winding and a predetermined amount of external rotor resistance so that said wound rotor motor has a drooping torque characteristic to thereby provide stability for the regulator system, and circuit means for so connecting the output of the push-pull magnetic amplifier to said control winding that the phase relationship between the current flow through said control winding and the current flow through said reference winding varies in accordance with the direction of the deviation of the direct-current output voltage of the watt-sensing network from the direct-current output voltage of the voltage reference network, to thereby effect a rotation of said wound rotor motor in a given direction to thus maintain a substantially constant horsepower input to said pulp refiner.

4. In a regulator system for maintaining a substantially constant horsepower input to a pulp refiner having a rotating element and an enclosure, the combination comprising, a drive motor for driving the rotating element of said pulp refiner, a current-sensing network for producing at its output a direct-current voltage that is a measure of the current input to said drive motor, a voltage reference network for producing at its output a direct-current voltage, a push-pull magnetic amplifier responsive to the difference in direct-current output voltages of the voltage reference network and the current-sensing network, a multi-phase wound rotor motor for controlling the positioning of the rotating element with respect to the enclosure of said pulp refiner, said wound rotor motor having a reference winding and a control winding and a predetermined amount of external resistance so that said wound rotor motor has a drooping torque characteristic to thereby provide stability for the regulator system, and circuit means for so connecting the output of the push-pull magnetic amplifier to said control winding that the phase relationship between the current flow through said control winding and the current flow through said reference winding varies in accordance with the direction of the deviation of the direct-current output voltage of the current-sensing network from the direct-current output voltage of the voltage reference network, to thereby effect a rotation of said wound rotor motor in a given direction in accordance with such deviation to thus maintain a substantially constant horsepower input to said pulp refiner.

5. In an arc furnace regulator system for maintaining a substantially constant arc, the combination comprising, a movable electrode, a multi-phase wound rotor motor for effecting a movement of the movable electrode, said motor having a reference winding and a control winding and a predetermined amount of external rotor resistance so that said motor has a drooping torque characteristic to thereby provide stability for the arc furnace regulator system, a push-pull magnetic amplifier responsive to the arc current of the movable electrode and to the arc voltage of the movable electrode, said amplifier being so constructed that opposite effects are produced therein by changes in the magnitude of said arc current and by changes in the magnitude of said arc voltage, and circuit means for connecting the output of said amplifier to the control winding of said motor so that an increase in said arc current above its regulated value effects a current flow through the control winding of said motor which has a given phase relationship to the current flow through said reference winding to thereby effect a movement of the movable electrode in a given direction and so that with an increase in said arc voltage above its regulated value, the current flow through the control winding of said motor has a different phase relationship with respect to the current flow through said reference winding than said given phase relationship to thereby effect a movement of the movable electrode in a direction opposite to said given direction.

References Cited in the file of this patent

UNITED STATES PATENTS 2,632,145    Sikorra               Mar. 17, 1953